(12) United States Patent
Schnabel

(10) Patent No.: US 8,139,444 B2
(45) Date of Patent: Mar. 20, 2012

(54) ROUTINE CLOCK WITH VARIABLE INDICATORS

(76) Inventor: Guido Schnabel, Clemson, SC (US)

( * ) Notice: Subject to any disclaimer, the term of this patent is extended or adjusted under 35 U.S.C. 154(b) by 175 days.

(21) Appl. No.: 12/704,227

(22) Filed: Feb. 11, 2010

(65) Prior Publication Data

US 2011/0194381 A1    Aug. 11, 2011

(51) Int. Cl.
*G04B 19/00* (2006.01)
*G04B 19/26* (2006.01)
(52) U.S. Cl. ............... 368/76; 368/244; 368/17
(58) Field of Classification Search ............ 368/17, 368/244, 76
See application file for complete search history.

(56) References Cited

U.S. PATENT DOCUMENTS

| 4,208,870 | A |   | 6/1980  | Cullom |
|-----------|---|---|---------|--------|
| 5,105,397 | A | * | 4/1992  | Whitney ........................... 368/80 |
| 5,646,913 | A | * | 7/1997  | Quesenberry ................. 368/223 |
| D416,492  | S | * | 11/1999 | Peters ............................. D10/2 |
| 6,361,325 | B1|   | 3/2002  | McGuire |
| 6,416,216 | B1|   | 7/2002  | Haughey |
| 7,924,657 | B2| * | 4/2011  | Liebowitz ..................... 368/327 |
| 2006/0256665 | A1 |   | 11/2006 | Kadokura |
| 2010/0074061 | A1 | * | 3/2010 | Lee et al. ...................... 368/226 |
| 2010/0220554 | A1 | * | 9/2010 | Endresik ........................ 368/10 |

* cited by examiner

*Primary Examiner* — Sean Kayes
(74) *Attorney, Agent, or Firm* — Jim Passé; Bryan Shang; Passé Intellectual Property, LLC

(57) ABSTRACT

A routine clock for visually and audibly identifying time periods and events is disclosed. The routine clock may have indicators placed on the routine clock that may be variable in size corresponding to variable time periods. Within the time periods, unique events may be identified and when the time for a specific event has been reached, an audio announcement or visual indication or both may occur.

21 Claims, 3 Drawing Sheets

ROUTINE CLOCK WITH VARIABLE INDICATORS

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a routine clock and more specifically to a routine clock having variable indicators.

2. Description of Related Art

Establishing a daily routine for children or those not accustomed to telling time can be a challenging effort. A small child may not understand the concept of time or how to identify units of time. This may be especially difficult when dealing with traditional analog clocks. Since the dawn of time, various aids have been developed to assist in this endeavor.

U.S. Pat. No. 4,208,870 issued to Cullom describes an analog clock oriented visual reminder. The visual reminders in Cullom are visual representations of specific tasks or events, such as a spoon, for reminding someone to take medicine. These reminders are attached to the clock using small metal hooks and are placed around the face of the clock. Thus, when the minute hand of the clock reaches a specific item, such as the spoon, the person viewing the clock may be reminded to take cough medicine. Unfortunately, the clock in Cullom does not address duration of a specific event. The reminders are positioned around the face of the clock at predetermined places and are not easily modified.

Another drawback to the clock in Cullom is that there is no clear association between the events and the hands of the clock. Thus, it is up to the viewer to interpret the reminder and the time. For example, if a spoon is hung at the 3:00 position, does the viewer need to be reminded to take medicine at 3:00 or is it that at 15 minutes past the hour that the medicine is to be consumed? In addition, the indicator may be associated with 3:00 PM and not 3:00 AM, but again, it is up to the viewer to interpret the proper time to be reminded.

U.S. Pat. No. 6,416,216 issued to Haughey describes an event clock that identifies various events. The event clock in Haughey is a clock with a single hand which points to events which are placed around the clock in a radial fashion. As time passes, the hand rotates around and reminds the user that an event is to take place. In addition, the clock in Haughey may be programmed to be variable in time duration such that a 360 degree sweep of the single hand may correspond to a minute, 5 minutes, 60 minutes and so forth. However, the event clock in Haughey does not have multiple hands and as such, is not effective in telling time or indicating events at any time of the day.

U.S. Pat. No. 6,361,325 issued to McGuire describes a children's sleep time and clock device. The device as described in McGuire has a clock as well as a separate event wheel that rotates when the clock reaches the time for a particular event. The clock as described in McGuire has a separate event wheel that rotates independently from the hands of the analog clock. In addition, the clock in McGuire is used to identify sleep times as opposed to other events. The clock in McGuire cannot address activities other than sleep and thus, is not an effective tool in teaching routines as they relate to time.

One of the drawbacks of the prior art is that the identification of events is not presented in direct conjunction with an analog clock. Additionally, some of the prior art does not allow the events to be modified in duration. Other drawbacks of the prior art may not describe multiple or different activities as they may occur relative to the time as it is displayed on an analog clock. What is needed is a clock that allows events to be scheduled at any time for any duration and displayed upon an analog clock, thus allowing the viewer to visually understand telling time as well as provide the concept of time as it relates to a duration of an event.

The present invention overcomes some of the limitations associated with the previous clocks. The present invention identifies various periods of time on a clock and in conjunction with an indicator may annunciate an event for a given time. The periods of time may also be color coded to make it easier for a child to identify the time periods. In another aspect of the present invention, the event indicator may be variable in size in order to accurately reflect the duration of the specific event.

SUMMARY OF THE INVENTION

The present disclosure recognizes these needs and discloses such a clock. A routine clock is disclosed. The routine clock having a face upon which is positioned an hour hand where the hour hand is attached to a minute hand. The routine clock also having a first period indicator and a first event marker, the first period indicator and the first event marker are positioned upon the face. The first period indicator identifies a first period of time and the first event marker identifies an event which occurs during the first period of time when the minute hand and the hour hand reach a first predetermined position.

Another routine clock is disclosed. The routine clock having a face upon which is positioned an hour hand, which is attached to a minute hand. The routine clock also has a first period indicator, a first event marker, a daytime indicator and a night time indicator. The first period indicator is positioned upon the face and identifies a first period of time. The first event marker is positioned upon either the daytime indicator or the night time indicator and the first event marker identifies an event which occurs during the first period of time when the minute hand and the hour hand reach a first predetermined position.

A more complete understanding of the present invention, as well as further features and advantages of the invention, will be apparent from the following detailed description and the accompanying drawings.

DETAILED DESCRIPTION OF THE INVENTION

Figure 1:
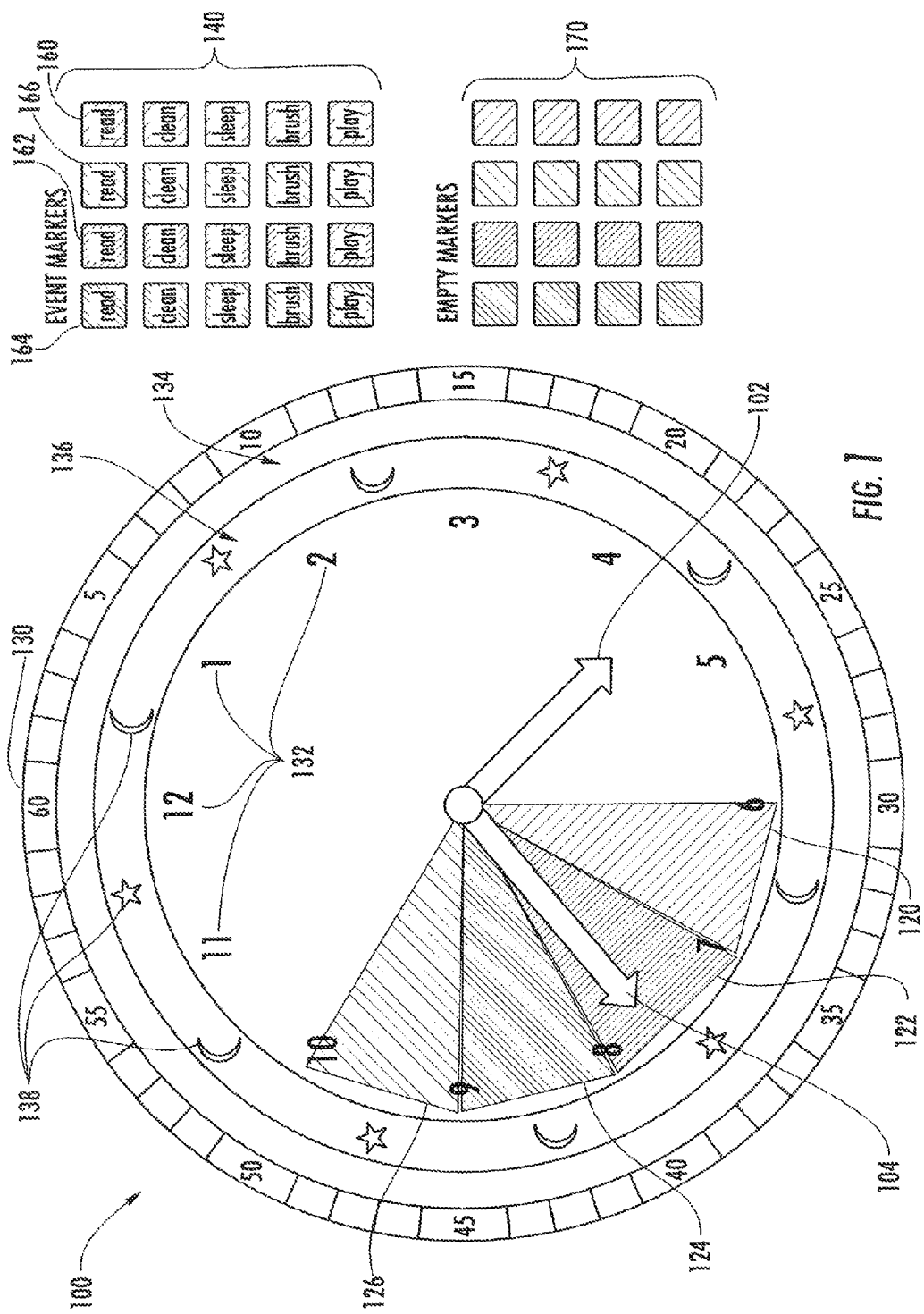
FIG. 1 displays a routine clock in accordance with one aspect of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Teaching someone how to tell time on an analog clock may be difficult. That there are 60 minutes in each hour and that the clock face shows 12 hours is a difficult concept to grasp. Couple that with the fact that a full day encompasses two different 12 hour periods, and a small child may become quickly frustrated trying to tell what time it is by looking at a clock. Several aspects of the present invention may be used to either teach someone how to tell time or reinforce these concepts.

FIG. 1 displays a routine clock 100 in accordance with one aspect of the present invention. As shown in FIG. 1, the routine clock 100 may be an analog clock that has both an hour hand 102 and a minute hand 104. Typical of any analog clock, the minute hand 104 and hour hand 102 rotate around the center of the routine clock 100. Displayed circularly around the face of the clock 100 are the minute indicators 130 and the hour indicators 132.

In between the minute indicators 130 and the hour indicators 132 are daytime and nighttime indicators 134 and 136. As can be seen in FIG. 1, the daytime and nighttime indicators 134 and 136 may correspond to two separate 12 hour periods that may be associated with nighttime or daytime. In one embodiment the daytime and nighttime indicators 134 and 136 may be concentric circles that maybe shaded or color coded to indicate brightness for daytime or darkness for nighttime. Alternatively, daytime and nighttime indicators 134 and 136 may contain shapes 138 corresponding to an activity that may occur during that period. Exemplary shapes 138 may be a crescent moon and stars to indicate nighttime. Alternatively, another shape 138 may be a sun indicating daytime (not shown for ease of illustration). The position of the daytime, nighttime, minute, or hour indicators may vary. For example, the minute indicators 130 could follow directly after the hour indicators 132 positioning the daytime 134 nighttime indicators 136 to the outside. Many combinations are possible.

As part of an alternative embodiment, the daytime and nighttime indicators 134 and 136 may be illuminated depending on the time. For example, during the time period from 6:00 PM to 6:00 AM, the nighttime indicator 136 may be illuminated. Then from 6:00 AM to 6:00 PM the daytime indicator 134 may be illuminated. As those skilled in the art may appreciate, the ability to illuminate the appropriate day or night indicators 134 and 136 may be programmable into the routine clock 100. In addition, a user may also set the duration of the daytime or nighttime indicators 134 or 136. Instead of programming the daytime and nighttime indicators 134 and 136 to be illuminated for a 12 hour period, the user may program the daytime and nighttime indicators 134 and 136 to more accurately reflect the actual light conditions experienced at the user's site. For example, should the routine clock 100 be installed in a home located well north of the equator the daylight hours will be longer during the summer time as opposed to the winter time when the days are significantly shorter. In one embodiment the user may activate an illumination switch (not shown for ease of illustration) located on the underside of the routine clock 100 for each daytime and nighttime indicators 134 and 136. The illumination switch may have activation and deactivation positions to correspond to the time when the daytime and nighttime indicators 134 and 136 are to be illuminated.

Another aspect of the present invention is the period indicators 120, 122, 124 and 126. As shown in FIG. 1, period indicator 120 is one hour long and is positioned between 6:00 and 7:00. Period indicator 122 is also one hour long and is positioned between 7:00 and 8:00. Period indicator 124 is also one hour long and is positioned between 8:00 and 9:00. The last period indicator 126 is one hour long and is positioned between 9:00 and 10:00. These indicators 120, 122, 124 and 126 may be color coded, pattern coded or identified in various ways to assist in differentiating between the various periods. For example, period indicator 120 may be purple, period indicator 122 may be orange, period indicator 124 may be green and period indicator 126 may be blue. In yet another alternative embodiment (not shown for ease of illustration), the routine clock 100 may have one to twelve (12) period indicators, each a different color or pattern and one hour in length equally disbursed around the face of the clock. In this embodiment, the viewer is able to visually differentiate the hours by color or pattern. However, the number of period indicators, their pattern and their duration, may vary and up to 12 period indicators is not meant as a limitation of the present invention.

In another embodiment, the period indicators may be variable in time duration and as such may be variable in size. For example, period indicators 120 and 122 may be replaced by another period indicator (not shown for ease of illustration) which when placed on the routine clock 100 is the same combined size (two hours). Although the period indicators 120, 122, 124 and 126 are shown as triangular, the base of the triangle (of the period indicators 120, 122, 124 and 126) closest to the nighttime indicator 136 may be an arc which follows the contours of the edge of the nighttime indicator 136.

The period indicators 120, 122, 124 and 126 when positioned on the routine clock 100 may begin to illuminate when the hour hand 102 is positioned at or about the beginning of the period indicators 120, 122, 124 and 126. For example, period indicator 120 may illuminate from 6:00 PM until 7:00 PM. As the hour hand 102 transitions to 7:00 PM, period indicator 120 may turn off while period indicator 122 may illuminate. This visual illumination transition may occur for the remaining period indicators 124 and 126 at 8:00 PM and 9:00 PM respectively. At 10:00 PM, period indicator 126 may then turn off. Illuminating the period indicators 120, 122, 124 and 126 allows the user to see time visually in one hour chunks.

As can be seen in FIG. 1, event markers 140 are displayed with the clock. The individual event markers 140 may correspond to a routine. For example, in one row the exemplary routine may be reading. Alternatively, cleaning may be another event marker 140 displayed in another row. Other types of routines may include, but are not limited to, brushing (teeth), sleeping, playing, praying, eating, exercising, waking up, and so forth. It is important to note that the event markers 140 may identify the event with words, drawings or pictures and could vary in size and shape, but are not limited to such examples.

The event markers 140 are grouped into columns 160, 162, 164 and 166 which may correspond to the period indicators 120, 122, 124 and 126. For example, the event markers 140 in column 160 may be purple to correspond to period indicator 120. Similarly, event markers 140 in column 162 may be orange, event markers 140 in column 164 may be green, and event markers 140 in column 166 may be blue.

The event markers are placed around the face of the routine clock 100. The manner of affixing the event markers 140 into place may be one of several methods. In one embodiment, the event markers 140 may be magnets. In an alternative embodiment, the event markers may be self adhesive stickers. In yet another alternative embodiment, the event markers 140 may be cloth fabric with Velcro on the back sides. In another embodiment, hooks may be used to attach the event markers 140 to the routine clock 100 at various minute positions.

In addition to the event markers 140, additional event markers 170 may be included with the routine clock 100. These additional event markers 170 may be user definable as necessary. The routine clock may be able to distinguish between all of the event markers 140 and 170 when placed upon the face. Any audible recordings associated with the event markers 170 may be recorded by the user during the initial set up of the routine clock 100. Alternatively, the audible recordings associated with the event markers 170 may be recorded at another time after the initial set up.

Figure 2:
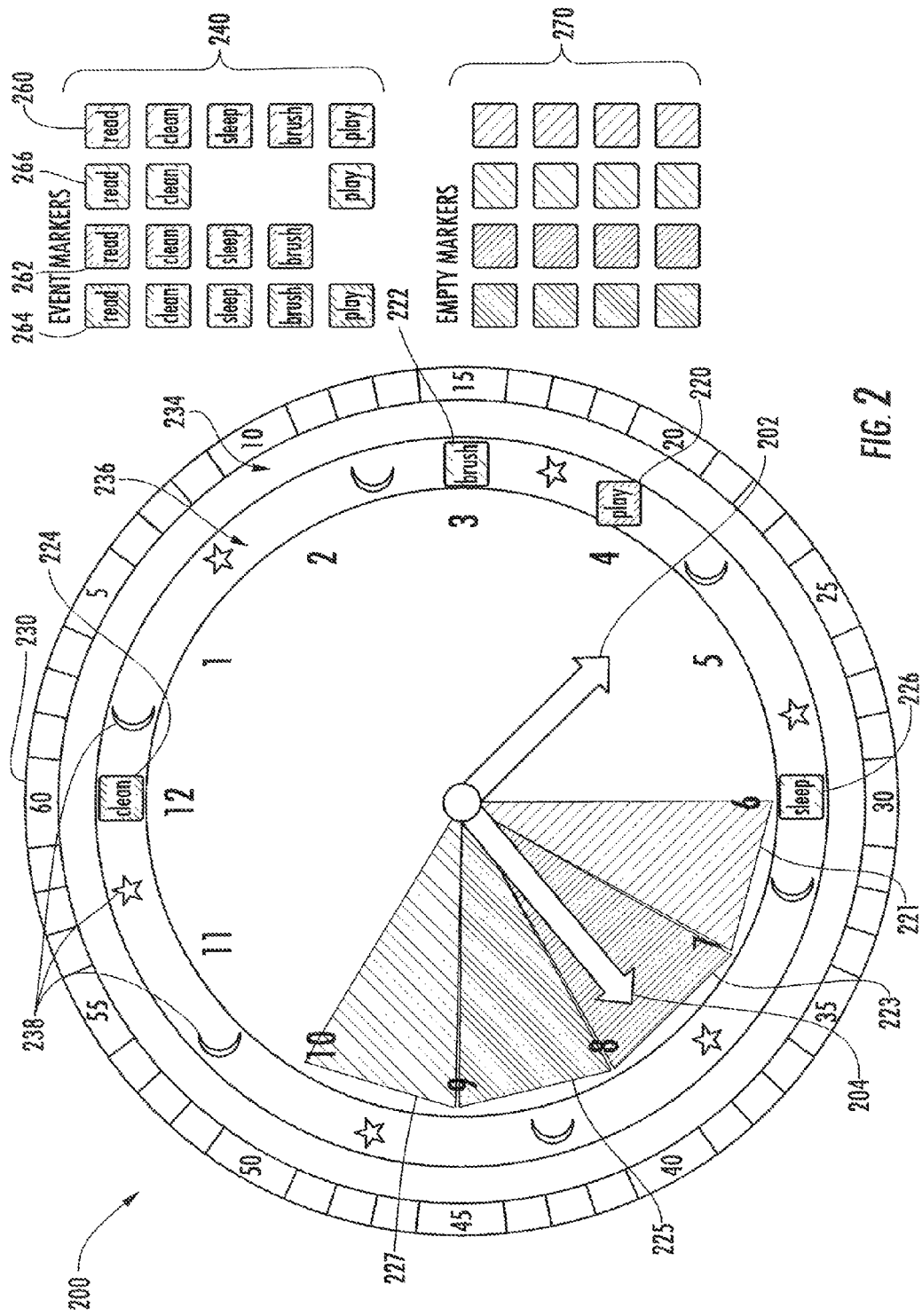
FIG. 2 displays a routine clock in accordance with another aspect of the present invention.

FIG. 2 displays a routine clock 200 in accordance with one embodiment of the present invention. The routine clock 200 has event markers 220, 222, 224 and 226 located at various positions around the face of the routine clock 200. Event marker 220 corresponds to the play marker that was removed from column 262. As can be seen in FIG. 2, period indicator 223 runs from 7:00 to 8:00. As described in the previously embodiment, period indicator 223 may be orange. Correspondingly, event marker 220 is also orange to indicate that this event marker 220 takes place during the time outlined by the period indicator 223. The event marker is positioned around the face of the routine clock 200 to correspond to the minute (during the associated time period) that the event is to take place.

The event markers 240 are grouped into columns 260, 262, 264 and 266 which may correspond to the period indicators 221, 223, 225 and 227. For example, the event markers 240 in column 266 may be green to correspond to period indicator 227. Similarly, event markers in column 262 may be blue, event markers 240 in column 264 may be green, and event markers 240 in column 266 may be pink.

As can be seen in FIG. 2, event marker 220 is the play marker for period indicator 223 and is positioned at about 20 minutes past the hour. When 7:20 PM comes around, the minute hand is positioned above the event marker 220 and the event marker 220 may illuminate. The illumination of event marker 220 may be in addition to the illumination of period indicator 223. This would indicate to the child or person trying to understand the concept of time that it is time to play.

Additionally, the routine clock 200 may have some type of audible indicator to correspond to the activity. For example, when the event marker 220 became active, a recording stating, "time to play quietly" could be announced. As those skilled in the art may appreciate, the audible indicator may be prerecorded when the routine clock 200 is initially set up. In yet another embodiment, a default announcement may be provisioned to indicate the event.

In order to activate the audible indicator, the routine clock may have a way to distinguish not only what the event is but which period it is associated with. Referring to the previous example, a sensor in the minute hand 204 may be able to detect identifying information from the event marker 220, 222, 224 and 226 as it passes next to or over it. In one embodiment, actual contact may be made between the minute hand and the event marker 220, 222, 224 and 226. In this embodiment, the contact may initiate information transfer utilizing "one button" technology. Alternatively, a sensor in the routine clock 200 may detect the event marker's position and the position of the minute hand 204 then process this information accordingly. In this embodiment, a light sensor and a light source may be used. For example, the minute hand 204 may have a light source and the event markers 220, 222, 224 and 226 may have a light sensor so that when the minute hand 204 passes over the event markers 220, 222, 224 and 226, the sensors in the event markers 220, 222, 224 and 226 detects the light and routine clock 200 processes the information accordingly. Alternatively, the light source may be on the clock itself and as the minute hand 204 passes over the light source, the clock may be able to detect its position as well as the position and type and duration of the event markers 220, 222, 224, 226. Other embodiments may include, but are not limited to, ultrasound technology, lasers, magnetic sensors, and the like.

In yet another embodiment, the routine clock 200 may be programmed with the appropriate information corresponding to the event markers 240. For example, the user may program into the routine clock 200 that 7:20 PM is play time during the time indicated by the period indicator 223. As may be appreciated by those skilled in the art, a microprocessor (not shown for ease of illustration) or other type of electronic logic with sufficient memory may be used within the routine clock 200 to interpret the information presented on the routine clock 200 and activate the appropriate visual and audible responses. The time duration for illuminating the appropriate event markers 240 may also be programmed into the routine clock 200.

Referring back to FIG. 2, event marker 224 is the cleaning event marker associated with the period indicator 225 and is positioned at or around the top of the hour. Thus, at or about 8:00 PM, the routine clock 200 may illuminate the period indicator 225 as well as the event marker 224. In addition, at 8:00 PM, the routine clock 200 may make an audible announcement to say "time to pick up." In this example, the child may have lots to pick up so the next event would be the brush event corresponding to event marker 222 which is displayed positioned at or about 15 minutes past the hour.

As is shown in FIG. 2, the event marker 222 is associated with the period indicator 227. Thus, at or about 9:00 PM, the routine clock 200 may illuminate the period indicator 227. Then, at or around 9:15 PM the routine clock 200 may illuminate the event marker 222 and make an audio announcement such as "time to brush your teeth."

The event marker 226 is to identify the time to go to sleep and is also associated with period indicator 227. As can be seen in FIG. 2, event marker 226 is positioned at or around 30 minutes past the hour. Thus, at around 9:30 PM, the event marker 226 may illuminate and an audible alarm may be given. In one exemplary audio announcement, a recording may state, "time to go to bed."

Figure 3:
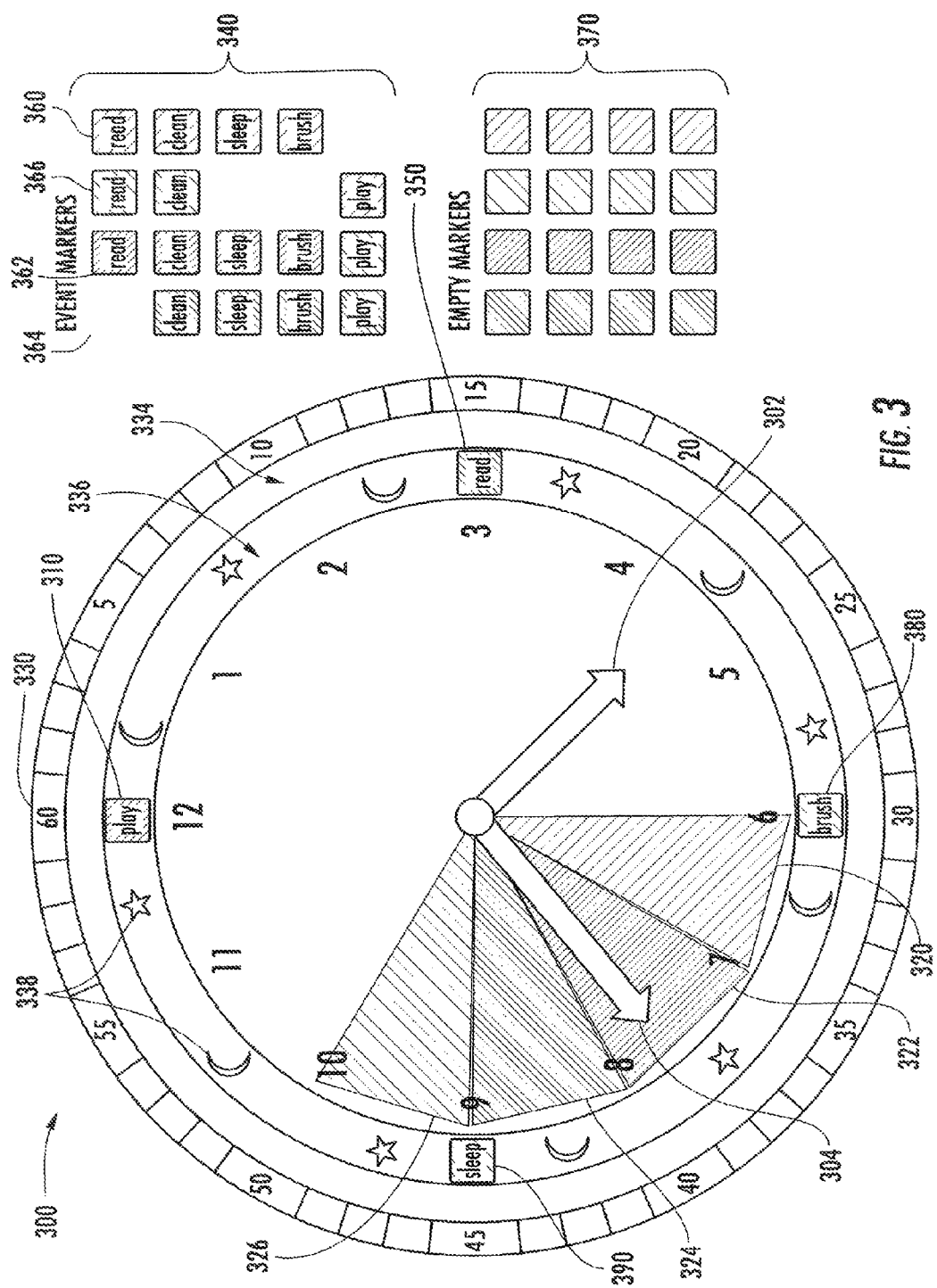
FIG. 3 displays a routine clock in accordance with yet another aspect of the present invention.

FIG. 3 displays a routine clock 300 in accordance with another embodiment of the present invention. The routine clock 300 is similar to the routine clock shown in FIG. 2 except the routine clock 300 has event markers 310, 350, 380 and 390 distributed during different period indicators 320, 322, 324 and 326.

Event markers 340 are grouped into columns 360, 362, 364 and 366 which may correspond to the period indicators 320, 322, 324 and 326. For example, the event markers 340 in column 366 may be lavender to correspond to period indicator 326. Similarly, event markers in column 362 may be blue, event markers 340 in column 364 may be green, and event markers 340 in column 366 may be pink.

As can be seen in FIG. 3, the routine clock 300 has the event marker 310 that is associated with period indicator 320. As stated previously, period indicator 320 corresponds to the time period between the hours of 6:00 and 7:00. With the event marker 310 positioned at or about the top of the hour, and upon the nighttime indicator 336, at 6:00 PM, the routine clock 300 may illuminate the event marker 310. In addition, the routine clock may also have an audible announcement that occurs at about the same time. As can be seen in the figure, the event marker 310 indicates the play activity. As mentioned previously an exemplary audio announcement may be a recording stating, "time to play quietly."

The next event marker that the routine clock 300 will encounter is event marker 350 which is positioned upon the nighttime indicator 336 at about the 15 minutes past the hour. Event marker 350 is associated with period indicator 324 which identifies a period of time between 8:00 and 9:00. The routine clock 300 will interpret where the event marker 350 is positioned to mean that at 8:15 PM, the event marker 350 may illuminate. In addition to the event marker illuminating, an audio recording stating, "time to read" could be announced at about the same time.

The third event marker that the routine clock 300 will encounter is event marker 380. Event marker 380 is associated with period indicator 326. As can be seen in FIG. 3, event marker 380 is positioned upon the face of the clock at about thirty minutes past the hour and is also positioned upon the nighttime indicator 336. Period indicator 326 identifies a period of time between 9:00 and 10:00. The routine clock 300 will interpret where the event marker 380 is positioned to mean that at 9:30 PM, the event marker 380 may illuminate. In addition to the event marker 380 illuminating, an audio recording stating, "time to brush your teeth" could be announced at about the same time.

The final event marker that the routine clock 300 will encounter is event marker 390. Event marker 390 is also associated with period indicator 326. As can be seen in FIG. 3, event marker 390 is positioned upon the face of the clock at about 45 minutes past the hour and is also positioned upon the nighttime indicator 336. As described previously, period indicator 326 identifies a period of time between 9:00 and 10:00. The routine clock 300 will interpret where the event marker 390 is positioned to mean that at 9:45 PM, the event marker 390 may illuminate. In addition to the event marker illuminating, an audio recording stating, "time to go to bed" could be announced at about the same time.

As shown in the previous figures, nighttime examples were discussed. Instead of nighttime activities, the routine clock could also be used to identify daytime activities. For example, waking up, brushing teeth, getting dressed, and coming to the breakfast table may be typical events of a morning routine. During school hours, the period indicators may correspond to periods of class time or class activities. A normal school schedule may contain five class periods. The routine clock may be used to identify each period by illuminating the period number as well as announce the period.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A routine clock comprising:
   an analog clock, the analog clock further comprising
   an hour hand;
   a minute hand,
   an hour indicator, and;
   a minute indicator, the minute hand and the hour hand rotating around a center point of the analog clock, the minute and hour indicators positioned circumferally around the analog clock, the routine clock further comprising;
   a concentric circle positioned at or near the hour indicators, the concentric circle representing either a nighttime or daytime indicator,
   a period indicator positioned on the analog clock between the hour indicators, the period indicator having a first boundary and a second boundary, the period indicator indicating a time period, the time period comprising time between the first and second boundary; and, an event marker, positioned upon the concentric circle, the event marker identifying an event which occurs when the minute hand is at or about the event marker and the hour hand is positioned between the first and second boundaries.

2. The routine clock of claim 1 wherein the first event marker corresponds to an activity.

3. The routine clock of claim 2 wherein the activity is reading.

4. The routine clock of claim 2 wherein the activity is cleaning.

5. The routine clock of claim 2 wherein the activity is playing.

6. The routine clock of claim 1 further comprising an audible announcement wherein the audible announcement is announced when the event occurs.

7. The routine clock of claim 6 wherein the audible announcement relates to an activity related to the event marker.

8. The routine clock of claim 1 wherein the daytime indicator or the night time indicator is illuminated during daylight or nighttime hours respectively.

9. The routine clock of claim 1 wherein the event marker illuminates when the event occurs.

10. The routine clock of claim 9 wherein the event marker illumination is discontinued when the hour hand passes beyond the time period.

11. A routine clock comprising:
an analog clock, the analog clock further comprising;
an hour hand,
a minute hand;
an hour indicator, and;
a minute indicator, the minute hand and the hour hand rotating around a center point of the analog clock, the minute and hour indicators positioned circumferally around the analog clock, the routine clock further comprising;
a first and second concentric circle positioned at or near the hour indicators, the first concentric circle representing a nighttime indicator and the second concentric circle representing a daytime indicator, the routine clock further comprising;
a period indicator; and,
an event marker,
the first period indicator positioned on the analog clock between the hour indicators, the period indicator having a first boundary and a second boundary, the period indicator indicating a time period, the time period comprising time between the first and second boundary the event marker positioned upon either the daytime indicator or the night time indicator, the event marker identifying an event which occurs when the minute hand is at or about the event marker and the hour hand is positioned between the first and second boundaries.

12. The routine clock of claim 11 wherein the event marker corresponds to an activity.

13. The routine clock of claim 11 further comprising an audible announcement wherein the audible announcement is announced when the event occurs.

14. The routine clock of claim 13 wherein the audible announcement relates to an activity related to the first event marker.

15. A routine clock comprising:
an analog clock, the analog clock further comprising;
an hour hand,
a minute hand;
an hour indicator, and;
a minute indicator, the minute hand and the hour hand rotating around a center point of the analog clock, the minute and hour indicators positioned circumferentially around the analog clock, the routine clock further comprising;
a first and second concentric circle positioned at or near the hour indicators, the first concentric circle representing a nighttime indicator and the second concentric circle representing a daytime indicator, the routine clock further comprising;
a plurality of period indicators; and,
a plurality of event markers,
the plurality of period indicators positioned on the analog clock between the hour indicators, the period indicators each having a first boundary and a second boundary, the period indicators each indicating a time period, the time period comprising time between the first and second boundaries, the period indicators relating to the event markers, the plurality of event markers positioned upon either the daytime indicator or the night time indicator and each of the event markers identifying an event which occurs when the minute hand is at or about the event marker and the hour hand is positioned between the first and second boundaries of the related period indicator.

16. The routine clock of claim 15 wherein the event markers corresponds to activities.

17. The routine clock of claim 15 further comprising an audible announcement wherein the audible announcement is announced when the events occur.

18. The routine clock of claim 11 wherein the event marker illuminates when the event occurs.

19. The routine clock of claim 18 wherein the event marker illumination is discontinued when the hour hand passes beyond the time period.

20. The routine clock of claim 15 wherein each event marker illuminates when the event occurs.

21. The routine clock of claim 20 wherein the event marker illumination is discontinued when the hour hand passes beyond the time period.

* * * * *